United States Patent
Favor et al.

(10) Patent No.: US 7,349,398 B1
(45) Date of Patent: Mar. 25, 2008

(54) METHOD AND APPARATUS FOR OUT-OF-ORDER PROCESSING OF PACKETS

(75) Inventors: John G. Favor, Scotts Valley, CA (US); Edmund G. Chen, Sunnyvale, CA (US); Stephan Meier, Sunnyvale, CA (US)

(73) Assignee: Redback Networks, Inc., San Jose, CA (US)

( * ) Notice: Subject to any disclaimer, the term of this patent is extended or adjusted under 35 U.S.C. 154(b) by 1067 days.

(21) Appl. No.: 10/193,504

(22) Filed: Jul. 10, 2002

Related U.S. Application Data

(60) Provisional application No. 60/345,416, filed on Dec. 31, 2001.

(51) Int. Cl.
*H04L 12/56* (2006.01)
*H04L 12/54* (2006.01)
*G06F 9/44* (2006.01)

(52) U.S. Cl. .................. 370/394; 370/429; 712/245
(58) Field of Classification Search .............. None
See application file for complete search history.

(56) References Cited

U.S. PATENT DOCUMENTS

| | | | |
|---|---|---|---|
| 4,901,233 A | 2/1990 | Liptay | |
| 5,197,132 A | 3/1993 | Steely, Jr. et al. | |
| 6,327,625 B1 * | 12/2001 | Wang et al. | 709/235 |
| 6,781,992 B1 * | 8/2004 | Rana et al. | 370/394 |
| 7,072,342 B1 * | 7/2006 | Elnathan | 370/394 |
| 7,088,719 B2 * | 8/2006 | Brown et al. | 370/394 |
| 2003/0053461 A1 * | 3/2003 | Ross | 370/394 |
| 2005/0089308 A1 * | 4/2005 | Sugai et al. | 370/394 |

OTHER PUBLICATIONS

White Paper, "Building Next Generation Network Processors," dated Apr. 2001 (14 pages).
EE Times—Selecting an appropriate programming model; http:www.eetimes.com/in_focus/embedded_system/OEG20020802S0036 dated Feb. 24, 2003.

* cited by examiner

*Primary Examiner*—Wing Chan
*Assistant Examiner*—Gregory Sefcheck
(74) *Attorney, Agent, or Firm*—Blakely, Sokoloff, Taylor & Zafman, LLP

(57) ABSTRACT

A method and apparatus for out-of-order processing of packets are described. In one embodiment, the method includes receiving packets in a global order, the packets being designated for different ones of a plurality of reorder contexts. The method also includes, for each of the plurality of reorder contexts, assigning reorder context sequence numbers indicating an order relative to the global order of the packets designated for that reorder context. The method also includes storing packet descriptors for each of the packets in a shared reorder buffer, and completing processing of at least certain of the packets out of the global order. The method also includes, for each of the plurality of reorder contexts, maintaining a first indication of the one of the sequence numbers assigned the one of the packets that is next to be retired for that reorder context. The method also includes retiring the packets from the shared reorder buffer, based on the sequence numbers, in order with respect to each of the plurality of reorder contexts, but out of the global order for at least certain of the packets.

26 Claims, 12 Drawing Sheets

METHOD AND APPARATUS FOR OUT-OF-ORDER PROCESSING OF PACKETS

The present application claims priority to the provisional filed application entitled *Method and Apparatus for Out-Of-Order Processing of Packets,* filed on Dec. 31, 2001, Ser. No. 60/345,416, which is also incorporated herein by reference.

FIELD OF THE INVENTION

The invention relates to the field of networking. More specifically, the invention relates to out-of-order packet processing.

BACKGROUND OF THE INVENTION

A network element for routing packets (e.g., Internet Protocol ("IP") packets, Ethernet packets, etc.) typically includes a number of slots for receiving line cards. Each line card has one or more ports for connecting media on which packets can be received. In order to process the packets, the network element will include one or more packet processors. For example, each line card will include one or more packet processors.

A packet processor on a line card that processes packets coming into the network element (an ingress packet processor) will typically be processing packets from several different "micro-flows" at a time. A micro-flow describes all of the packets transmitted from the same address and port to the same destination address and port as part of an exchange of information between two applications during a given time period (e.g., a Transmission Control Protocol session). While packet protocols (such as the IP packet protocol) allow the destination to correct for the receipt of the packets from a given micro-flow out-of-order, such correction shows performance. Thus, many network elements are designed such that the packets of a given micro-flow received on the same interface are transmitted out of the network element in the order in which those packets were received by the network element.

One packet processor design includes multiple execution units and scheduling/reordering software. The scheduling/reordering software, running on one or more of the execution units, is used to control the processing of the packets being received by the packet processor. This software operates such that the order in which the packets are transmitted out of the packet processor is the same as the order in which they were received (referred to herein as "globally" in order), but allows, to a certain extent, the packets to be processed out-of-order. The global ordering ensures that the ordering of the packets of a given micro-flow received on a given interface is maintained, while the out-of-order processing allows for improved performance.

In particular, the software (executing on the multiple execution units) maintains a separate queue for each slot/line card. The software assigns each incoming packet (based on the packet's header) to the queue for the line card over which that packet will be transmitted out of the network element. Therefore, the packets from a given micro-flow received at a given interface will all be assigned to the same queue, and multiple micro-flows are typically assigned to the same queue. When an execution unit is freed up for processing another packet, the software determines from which queue the next packet is selected for processing. In addition, the software tracks the order in which the packets were received by the network element and buffers the processed packets so that the processed packets can be made to exit the packet processor in the same order.

One disadvantage of this packet processor design is that the scheduling/reordering software requires a relatively large amount of the processing power provided by the execution units of the packet processor. Another disadvantage of this packet processor design is that although different packets take different amounts of time to process, the packets must exit the packet processor in the order in which they were received (due to the global ordering). As a result, a packet that is taking a relative significant amount of time to process can prevent later received, but already processed packets from exiting the packet processor.

SUMMARY OF THE INVENTION

These and other aspects of the present invention will be better described with reference to the Detailed Description and the accompanying figures. A method and apparatus for processing out-of-order processing of packets is described. In one embodiment, the method includes receiving packets in a global order, the packets being designated for different ones of a plurality of reorder contexts. The method also includes, for each of the plurality of reorder contexts, assigning reorder context sequence numbers indicating an order relative to the global order of the packets designated for that reorder context. The method also includes storing packet descriptors for each of the packets in a shared reorder buffer, and completing processing of at least certain of the packets out of the global order. The method also includes, for each of the plurality of reorder contexts, maintaining a first indication of the one of the sequence numbers assigned the one of the packets that is next to be retired for that reorder context. The method also includes retiring the packets from the shared reorder buffer, based on the sequence numbers, in order with respect to each of the plurality of reorder contexts, but out of the global order for at least certain of the packets.

BRIEF DESCRIPTION OF THE DRAWINGS

The invention may best be understood by referring to the following description and accompanying drawings that are used to illustrate embodiments of the invention. In the drawings.

DETAILED DESCRIPTION

A method and apparatus for out-of-order packet processing are described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

In one embodiment, packets entering the packet processor in a particular global order are associated with different reorder contexts, processed irrespective of the global order, and reordered to exit the packet processor in order with regard to their reorder context, but without regard to the global order. The number of reorder contexts is implementation dependent (e.g., the number of reorder contexts could equal the number of slots in the network element, the number of reorder context could a number chosen so as to maximize throughput for a given implementation, such as 1024, etc.) All of the packets from a given micro-flow that are received over the same interface are allocated to the same reorder context. In addition, depending on the number of reorder contexts implemented, multiple micro-flows can be associated to the same reorder context.

Packets are referred to herein as either in-flight or out-of-flight. Packets are considered "in-flight" when they are being processed or are being stored for reordering. Otherwise, packets are considered "out-of-flight." In-flight packets have several numbers assigned to them for use in the reordering process; specifically each packet is an assigned a reorder context sequence number, a reorder context identifier, and a reorder buffer entry address.

Figure 1:
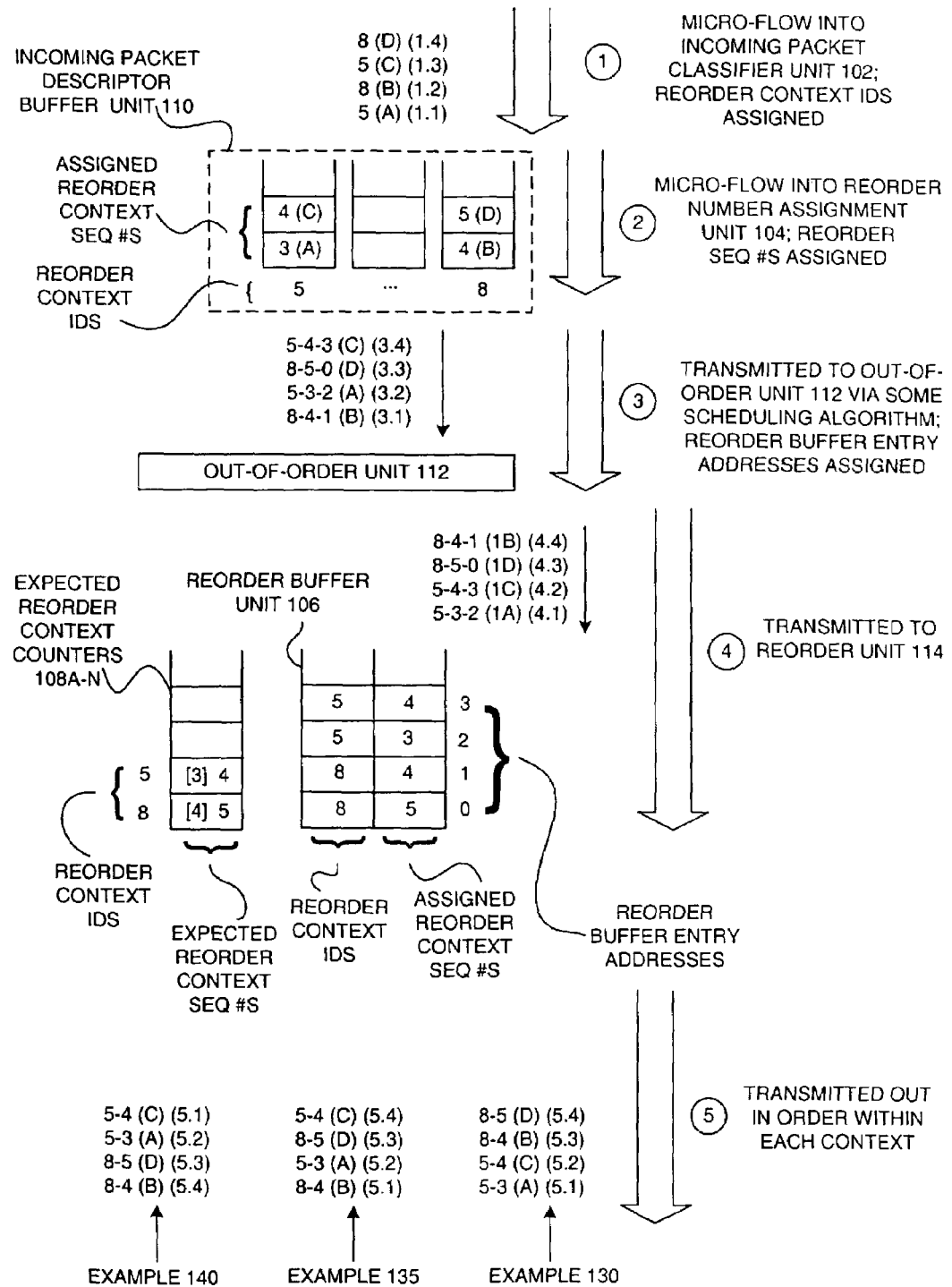
FIG. 1 is a conceptual data flow diagram illustrating the processing of several packets according to embodiments of the invention.

FIG. 1 is a conceptual data flow diagram illustrating the processing of several packets according to embodiments of the invention. In particular, FIG. 1 illustrates several exemplary flows of four packet descriptors labeled A, B, C, and D. A packet descriptor is data by which components track and access the actual packet for processing. In certain embodiments, a packet descriptor, as opposed to the packet itself, is used for tracking a packet for purposes of reordering since the entire packet is not needed (the packet itself is stored in memory). While the global order the packet descriptors is illustrated with the labels A-D, such a global receipt position is not tracked by certain embodiments of the invention.

FIG. 1 includes a series of numbered, vertical, descending arrows that each depicts a distinct stage in the flow of the four packets. Each of these stages in FIG. 1 will be referred to herein as "stage 1," "stage 2," etc. The order in which the packet descriptors are provided from stage to stage is indicated by decimal and second numeral following the operation number, e.g., "1.1," "1.3," etc. While a given packet descriptor flows through each of these stages, it should be understood that each of the packet descriptors need not flow through these stages and/or from stage to stage together (but can flow through different stages and pass from stage to stage at different times). Several units will be referred to in FIG. 1 (e.g., out-of-order unit 112, reorder unit 114, etc.) that will be discussed in more detail in connection with later Figures.

At stage 1, the four packet descriptors A-D are received by an incoming packet classifier unit 102 in a global order, where this global order is indicated by the order of the letters labeling these descriptors (as well as the labels 1.1, 1.2, 1.3, and 1.4). Each out-of-flight packet descriptor is assigned a reorder context identifier that identifies the reorder context with which the out-of-flight packet is associated. Specifically, the out-of-flight packet descriptors A and C are associated with reorder context 5, while descriptors B and D are associated with reorder context 8. While the example in FIG. 1 shows only two reorder contexts, it is understood there may exist any number of reorder contexts, e.g., 1024.

At stage 2, the out-of-flight packet descriptors are stored in an incoming packet descriptor buffer unit 110. While various implementations are discussed later herein, FIG. 1 shows that the incoming packet descriptor buffer unit 110 includes a buffer for each reorder context (5 and 8, in the example illustrated). Each out-of-flight packet descriptor is assigned a reorder sequence number, which in certain embodiments, is one of a sequential series of numbers that indicates a particular out-of-flight packet's order as it is received with respect to other out-of-flight packets also received in the same reorder context. In stage 2 of FIG. 1, the two out-of-flight packet descriptors A and C received for reorder context 5 are assigned reorder sequence numbers 3 and 4, respectively. The two out-of-flight packet descriptors B and D received for reorder context 8 are assigned reorder sequence numbers 4 and 5, respectively. Different embodiments may assign different numbers, for example, numbers starting higher or lower in the sequence, depending on the out-of-flight packet's relative position in regard to other out-of-flight packets received in the same reorder context.

At stage 3, the out-of-flight packet descriptors are transmitted to an out-of-order unit 112 via a scheduling algorithm. The out-of-order unit 112 represents any circuitry for handling the packets identified by the packet descriptors, including multiple execution units to access and process the packets identified by the packet descriptors. While any number of well known or later developed scheduling algorithm can be used, in one embodiment the scheduling algorithm schedules in a round-robin format, whereby it schedules one packet descriptor from each reorder context before scheduling another packet descriptor from the same reorder context. When a packet descriptor is transmitted to the out-of-order unit 112, it is assigned a reorder buffer entry address from a free list (discussed in more detail in connection with time 4, below) in a reorder buffer unit 106, transforming it into an in-flight packet. Thus, the packet descriptors A-D are respectively assigned the following reorder context identifiers, sequence numbers, and reorder buffer entry addresses: 5-3-2, 8-4-1, 5-4-3, and 8-5-0.

As illustrated in the example of FIG. 1, the packet descriptors are scheduled in the order B, A, D, and C as indicated by the labels 3.1, 3.2, 3.3, and 3.4. It should be understood that the order of provision of the packet descriptors to the out-of-order unit 112 is exemplary, and thus other orders are within the purview of the invention. In addition, while in the example of FIG. 1 one packet descriptor is provided to the out-of-order unit 112 at a time, alternative embodiments allow for more than one at a time.

At stage 4, the in-flight packet descriptors are transmitted from the out-of-order unit 112 to a reorder unit 114 in an order. While any number of different orders is possible, FIG. 1 shows the order A, C, D, and B to illustrate the embodiments of the invention do not require that the in-flight packet descriptors be completed in the order that they were received (see 4.1, 4.2, 4.3, and 4.4). For example, a given packet descriptor associated with a given reorder context and globally received after a different packet descriptor (from the same or a different reorder context) can be completed before that different packet descriptor. As another example, a given packet descriptor associated with a given reorder context and globally received after a different packet descriptor from a different reorder context can be completed before that different packet descriptor even enters stage 3. Thus, it should be evident that in-flight packet descriptors from different reorder contexts may enter stage 3 out of the global order with respect to other reorder contexts and that different in-flight packet descriptors may each require different amounts of processing time.

Each packet descriptor has its assigned reorder context identifier and sequence number stored at its assigned reorder buffer entry address in a reorder buffer unit 106. As part of this storing, each in-flight packet descriptor's assigned reorder context sequence number is compared to an expected reorder context sequence number for the same reorder context. The expected reorder context sequence numbers are managed by use of a counter for each context (expected reorder context counters 108A-N). The expected reorder context sequence numbers are used to track the next in-flight packet to be retired for a particular reorder context, and to maintain an order of transmission within that reorder context. For example, each reorder context identifier is associated with one of the expected reorder context counter 108A-N. The bracketed expected reorder sequence numbers illustrate that the sequence numbers are incremented by the counters as the appropriate in-flight packet is retired. If an in-flight packet descriptor, that is transmitted to the reorder unit 114, were assigned a reorder context sequence number that is identical to the expected reorder context sequence number for the associated reorder context, then that in-flight packet descriptor is marked as next to be retired in its context. If the in-flight packet's reorder context sequence number is not identical to the expected reorder context sequence number, then that in-flight packet descriptor is marked as not next to be retired.

In stage 5, the in-flight packet descriptors that are ready for retirement are transmitted out (retired) of the reorder unit 114, in order with regard to their particular reorder context, but not necessarily in global order. While in one embodiment the in-flight packet descriptors are transmitted at a rate of one packet per clock cycle, in alternative embodiments more packet descriptors can be retired at a time. At each in-flight packet descriptor is transmitted out of the reorder unit 114, typically: 1) its reorder buffer entry address is retired (making it an out-of-flight packet) and is added to the free list for stage 3; 2) the expected reorder context counter for its reorder context is incremented; and 3) if the incremented expected reorder context counter value is found for its context in an entry of the reorder buffer unit 106, then that entry is marked as next to be retired in its context. The reorder context identifier need not be retired because it is not a unique number, and is associated with a reorder context, which covers multiple packets.

FIG. 1 illustrates three exemplary orders in which the packet descriptors may be retired from the reorder unit 114. Each of these exemplary orders 130, 135, and 140 all retain the initial incoming order within each reorder context, but comprise a different global order. In particular, transmission in-order within a reorder context is achieved in each of the examples, while transmission in the global-order is not. However, it should be understood the packet descriptors might be retired in the global order.

Thus, a given packet descriptor associated with a given reorder context and globally received after a different packet descriptor from a different reorder context can be retired before that different packet descriptor. As another example, a given packet descriptor associated with a given reorder context and globally received after a different packet descriptor from a different reorder context can be retired before that different packet descriptor even enters stage 3. Thus, it should be evident that in-flight packets from different reorder contexts may be retired out of the global order with respect to other reorder contexts.

As a result, if a given packet or collection of packets from a micro-flow, which was assigned a given reorder context, is taking a relatively long time to process, packets assigned to other reorder contexts can be retired and transmitted out without waiting. Thus, the number of implemented reorder contexts affects the number of micro-flows that are assigned to the same reorder context. This reduces the interdependence among micro-flows, while increasing the speed with which packets are retired. Furthermore, the conceptual system of FIG. 1 can be implemented in hardware, thereby relieving the execution units from the task of tracking and ordering of the packets. In addition, the scheduling algorithm using in stage 3 can be implemented to provide different levels of quality of service to the different reorder contexts.

Packet Processor Unit

Figure 2:
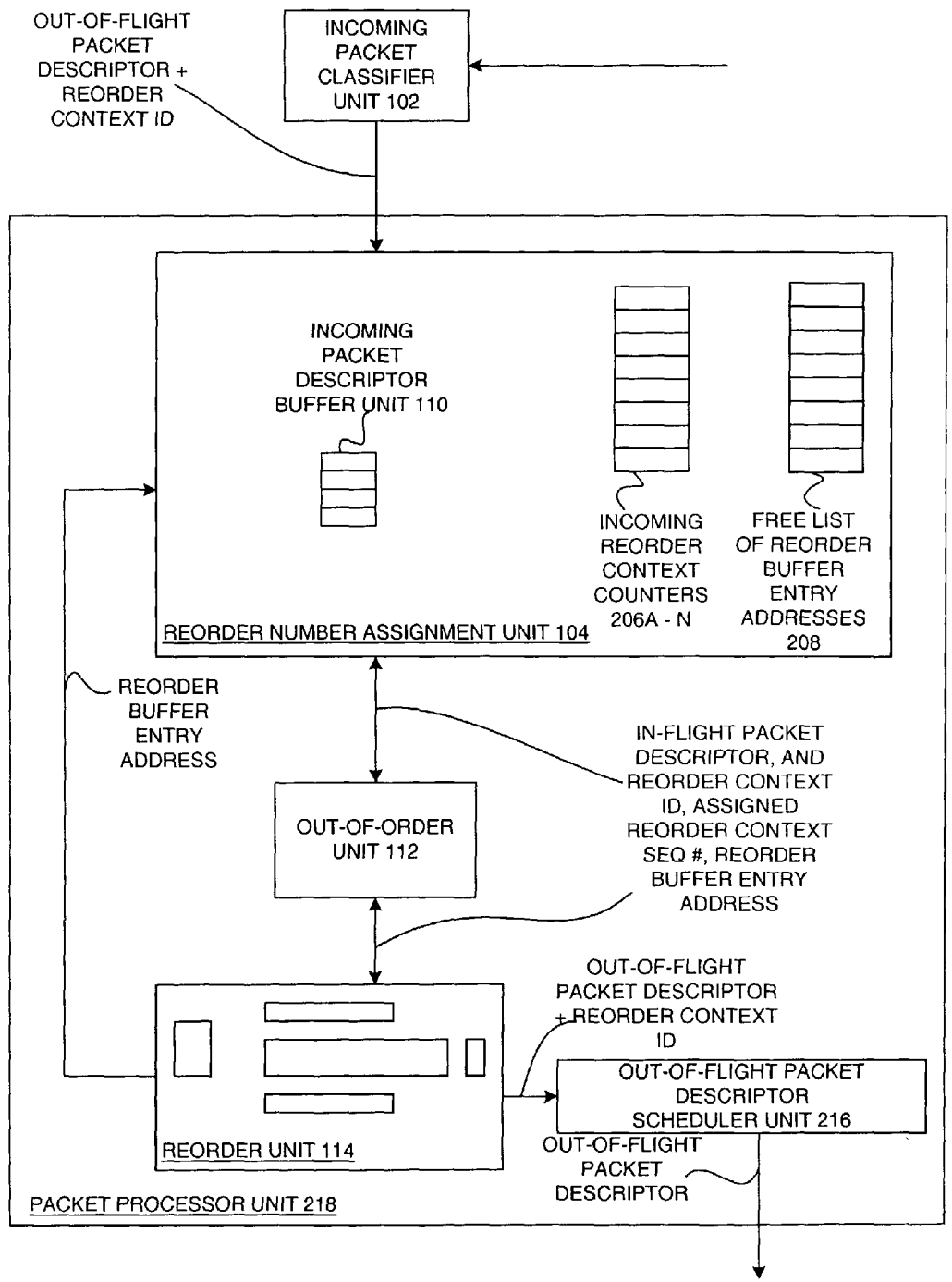
FIG. 2 is a block diagram illustrating portions of a packet processor unit according to embodiments of the invention.

FIG. 2 is a block diagram illustrating portions of a packet processor unit according to embodiments of the invention. In one embodiment, a packet processor unit 218 may be any chip for processing packets. For example, in one embodiment, the packet processor unit 218 may be an ingress or egress packet processor on a line card within a network element. The packet processor unit 218 comprises the reorder number assignment unit 104, which is coupled to the incoming packet classifier unit 102. While the incoming packet classifier unit 102 is shown outside of the packet processor unit 218; in alternative embodiments of the invention the incoming packet classifier unit 102 is included within the packet processor unit 218.

The incoming packet classifier unit 102 assigns packets to the different reorder contexts as evidenced by the assignment of a reorder context identifier. In certain embodiments of the invention, the packet classifier unit 102 may assign packets to the different reorder contexts based on the results of a hash function. For example, the packet classifier unit 102 may use a packet's source address and port, along with its destination address and port, to assign it to one of 1024 reorder contexts. Such a hash function will assign all packets of a micro-flow to the same reorder context, and it may assign multiple micro-flows to the same reorder context. However, the method for assigning micro-flows to reorder contexts is not so limited, as packets may be assigned to reorder contexts based on any number of relationships related to micro-flows and packets.

The reorder number assignment unit 104 further includes: 1) the incoming packet descriptor buffer unit 110 to store incoming packet descriptors; and 2) a set of incoming reorder context counters 206 A-N (where N is the number of reorder contexts) to assign reorder context sequence numbers to incoming packet descriptors. While in one embodiment the incoming packet descriptor buffer unit 110 comprises a buffer for each reorder context to store reorder context sequence numbers (as illustrated in FIG. 1), in alternative embodiments different buffer configurations are used (e.g., each buffer is operated as a FIFO and the reorder context sequence number need not be stored because the entry in the buffer is indicative of the reorder context sequence number, a single buffer is provided and tracking mechanisms are used to distinguish which packet descriptors belong to which reorder context). While in one embodiment each packet buffer can store 128 entries and each counter as 128 numerical possibilities, alternative embodiments can support more/less entries and/or different one of the buffers can have different numbers of entries.

The reorder number assignment unit 104 further includes a free list of reorder buffer entry addresses 208 ("free list 208"). Free lists are well known in the art, and the free list 208 is used to assign reorder buffer entry addresses to packet descriptors when transmitting them to the out-of-order unit 112, as discussed in connection with FIG. 1. In one embodiment, there are 128 entries in the reorder buffer unit 106, the number of possible in-flight packets at any given time. According to embodiments of the invention, there may be a counter associated with the free list 208 to simplify the determination of whether the list is empty. For example, in one embodiment the counter is incremented/decremented to represent the number of assigned reorder buffer entry addresses. If the counter is equal to the maximum number of assigned reorder buffer entry addresses (e.g. 128), no reorder buffer entry addresses are available. Therefore, there is no need to search the free list 208 for a reorder buffer entry address.

The out-of-order unit 112 requests an in-flight packet descriptor when it is able to process one. The reorder number assignment unit 104 schedules the out-of-flight packets for transmission to the out-of-order unit 112 responsive to the request. While in one embodiment the out-of-order unit 112 includes a number of execution units (e.g., 16) and memory controllers (e.g., 5), alternative embodiments include different components. Each execution unit can process one in-flight packet descriptor at any given time, while each memory controller may be used to store the actual packet in memory during processing, where the packet descriptor flows through the system. Upon completion of a given packet, the out-of-order unit 112 transmits that packet's descriptor to the reorder unit 114.

The reorder unit 114 reorders in-flight packet descriptors, which may have been processed out-of-order, for retirement in-order with respect to the reorder contexts. Exemplary contents of the reorder unit 114 are discussed in more detail in connection with FIG. 5 (below). Upon transmission from the reorder unit 114, packets are in order with respect to their reorder context, but not necessarily with respect to their global order.

The packet processor unit 218 further includes an out-of-flight packet scheduler unit 216 coupled to the reorder unit to schedule out-of-flight packets, which have been processed (possibly out-of-order) and subsequently reordered within their reorder contexts, for transmission.

Figure 3:
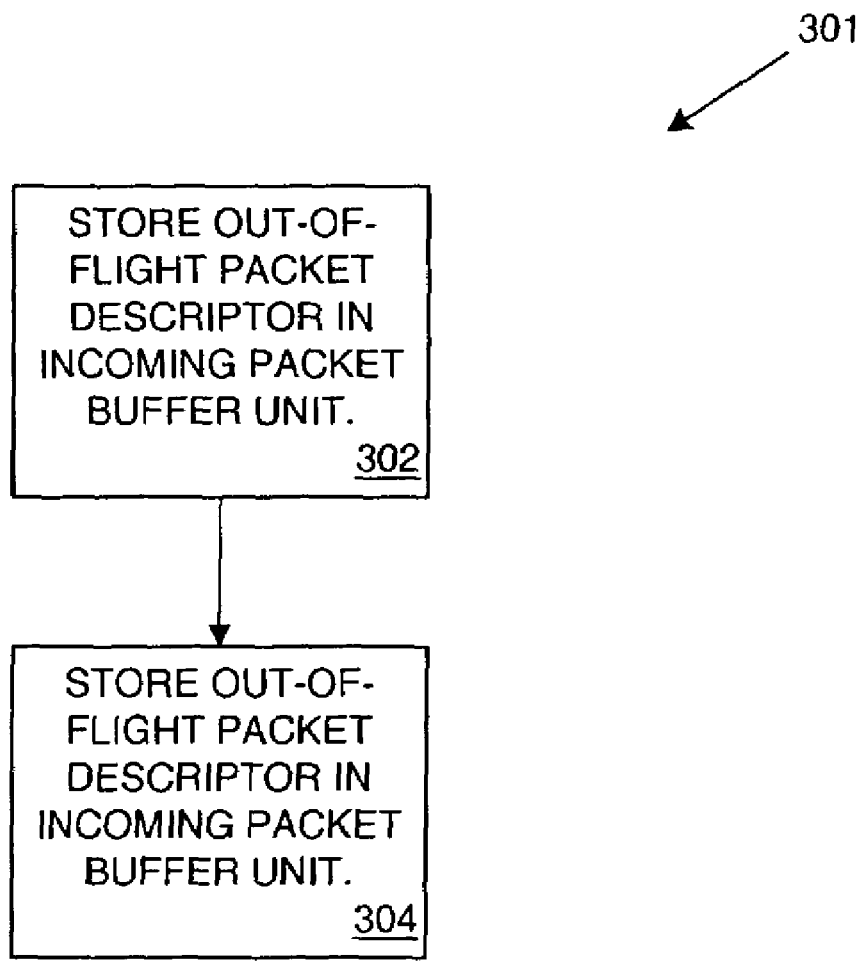
FIG. 3 is a flow diagram for the receipt of packet descriptors by the reorder number assignment unit 104 according to embodiments of the invention.

FIG. 3 is a flow diagram for the receipt of packet descriptors by the reorder number assignment unit 104 according to embodiments of the invention. In particular, FIG. 3 illustrates flow diagram 301, which begins at process block 302, with the assignment of a reorder context identifier to an out-of-flight packet by incoming the packet classifier unit 102. As mentioned previously, the reorder context identifier is unique to the reorder context, but not to each packet within the reorder context. From block 302, control passes to block 304.

At process block 304, the reorder number assignment unit 104 assigns a reorder context sequence number to the out-of-flight packet, using the incoming reorder context counters. From block 304, control passes to block 306.

At process block 306, the out-of-flight packet descriptor is stored in incoming packet descriptor buffer unit 110.

Figure 4:
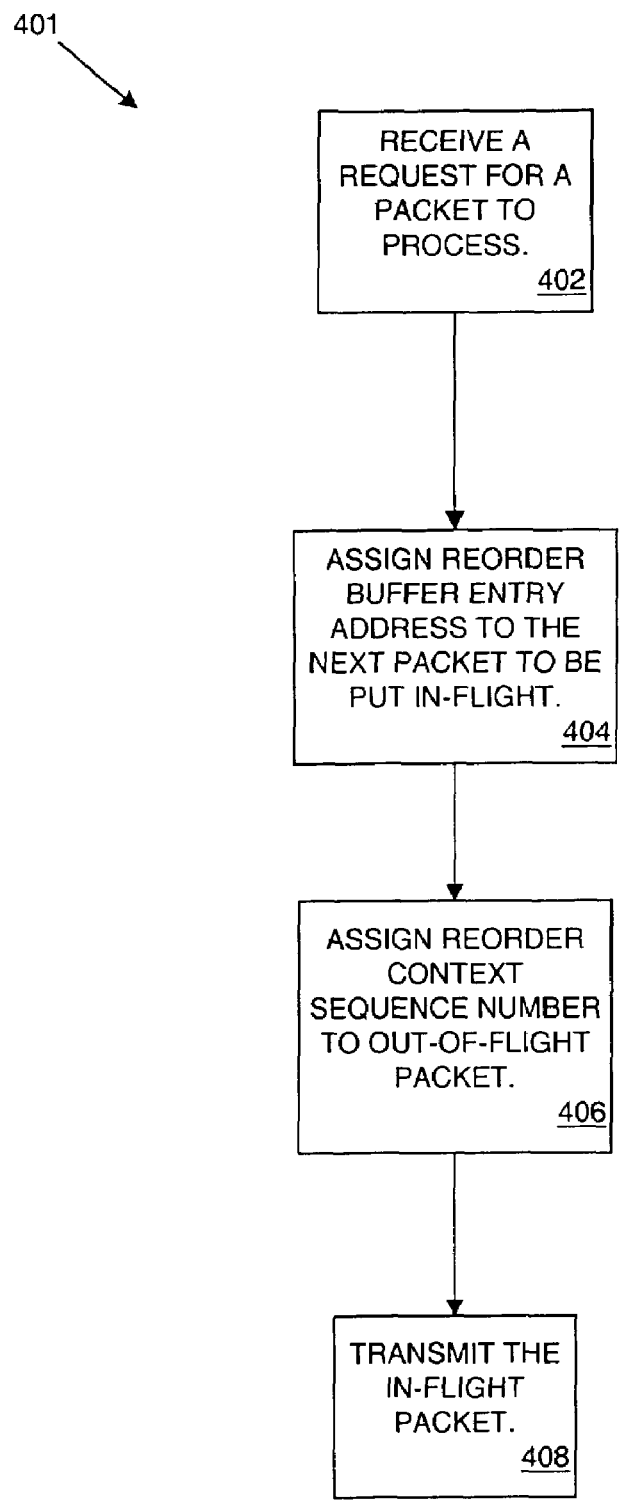
FIG. 4 is a flow diagram for the transmission of packet descriptors by the reorder number assignment unit 104 according to embodiments of the invention.

FIG. 4 is a flow diagram for the transmission of packet descriptors by the reorder number assignment unit 104 according to embodiments of the invention. In particular, FIG. 4 illustrates flow diagram 401, which begins at process block 402, with the receipt by the reorder number assignment unit 104 of a request from the out-of-order unit 112 for a packet to process. From block 402, control passes to block 404.

At process block 404, the reorder number assignment unit 104 schedules an out-of-flight packet for processing and assigns to that packet a reorder buffer entry address from the free list 208. From block 404, control passes to block 406.

In block 406, the reorder number assignment unit 104 then transmits the (now in-flight) packet's descriptor to the out-of-order unit 112 for processing.

Reorder Unit

Figure 5:
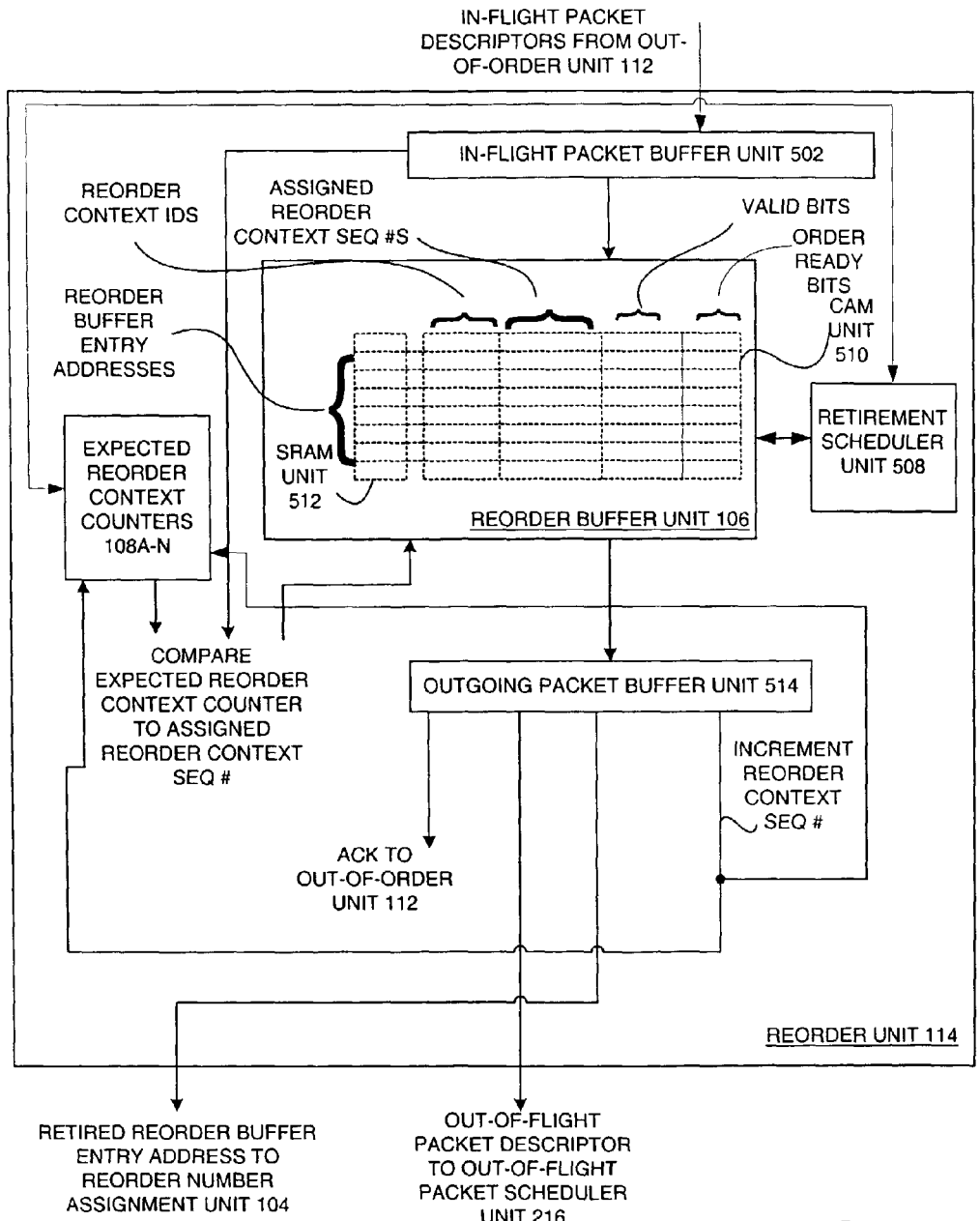
FIG. 5 is a block diagram illustrating portions of the reorder unit 114 according to embodiments of the invention.

FIG. 5 is a block diagram illustrating portions of the reorder unit 114 according to embodiments of the invention. In particular, FIG. 5 illustrates that reorder unit 214 includes an in-flight packet buffer unit 502 to store in-flight packet descriptors upon their receipt in the reorder unit 114. While being stored in the in-flight buffer unit 502, an in-flight packet's assigned reorder context sequence number is compared to the expected reorder sequence number from expected reorder context counters 108A-N (also, included in the reorder unit 114), as discussed in connection with FIG. 1. In an embodiment, expected reorder context counters 504A-N each count up to the maximum sequence number utilized in the incoming reorder context counters 206A-N.

The reorder unit 114 also includes the reorder buffer unit 106, coupled with the in-flight packet buffer unit 502, to store in-flight packet descriptors for reordering. In particular, the reorder buffer unit includes an SRAM unit 512 and a CAM unit 510. Both the SRAM unit 512 and the CAM unit 510 are addressed by the reorder buffer entry addresses. In one embodiment, the SRAM unit 512 is used to store an in-flight packet's descriptor, while the CAM unit 510 is used to store an in-flight packet's assigned seven bit reorder context sequence number and ten bit reorder context identifier, as well as valid and order ready bits. In alternative embodiments, the reorder sequence number and reorder context identifier may be represented by more or less bits, depending on the number of sequence numbers associated with each reorder context and the number of reorder contexts. Thus, the in-flight packet descriptors are stored in the CAM unit 510 and the SRAM unit 512 according to their reorder buffer entry addresses (which were assigned by the reorder number assignment unit 104 upon transmission of the (then out-of-flight) packet to the out-of-order unit 112). While in one embodiment in the reorder buffer unit 106 includes an SRAM and a CAM, alternative embodiments use different approaches (e.g., only a CAM is included and the packet descriptors are stored therein as well).

The reorder unit 114 further includes a retirement scheduler unit 508, coupled with the reorder buffer unit 106, to schedule in-flight packets for retirement. When an in-flight packet descriptor's assigned reorder context sequence number is identical to the expected reorder context sequence number, its order ready bit is set to indicate that it is the next packet in the context to be retired. In one embodiment, the retirement scheduler unit 508 schedules in-flight packets for retirement, when they are marked as ready, on a round robin scheme across all of the reorder contexts.

The reorder unit 114 further includes an outgoing packet buffer unit 514, coupled with the reorder buffer unit 106 and the expected reorder context counters 108A-N. The outgoing packet buffer unit 514 stores packet descriptors that are being retired, and outputs them to the out-of-flight packet scheduler unit 216. Upon being stored in outgoing packet buffer unit 514, a packet descriptor's reorder buffer entry address is retired as well, and returned to the free list 208. In one embodiment, the outgoing packet buffer unit 514 sends an ACK signal to the out-of-order unit 112, to indicate that space is available within reorder buffer unit 506.

Figure 6:
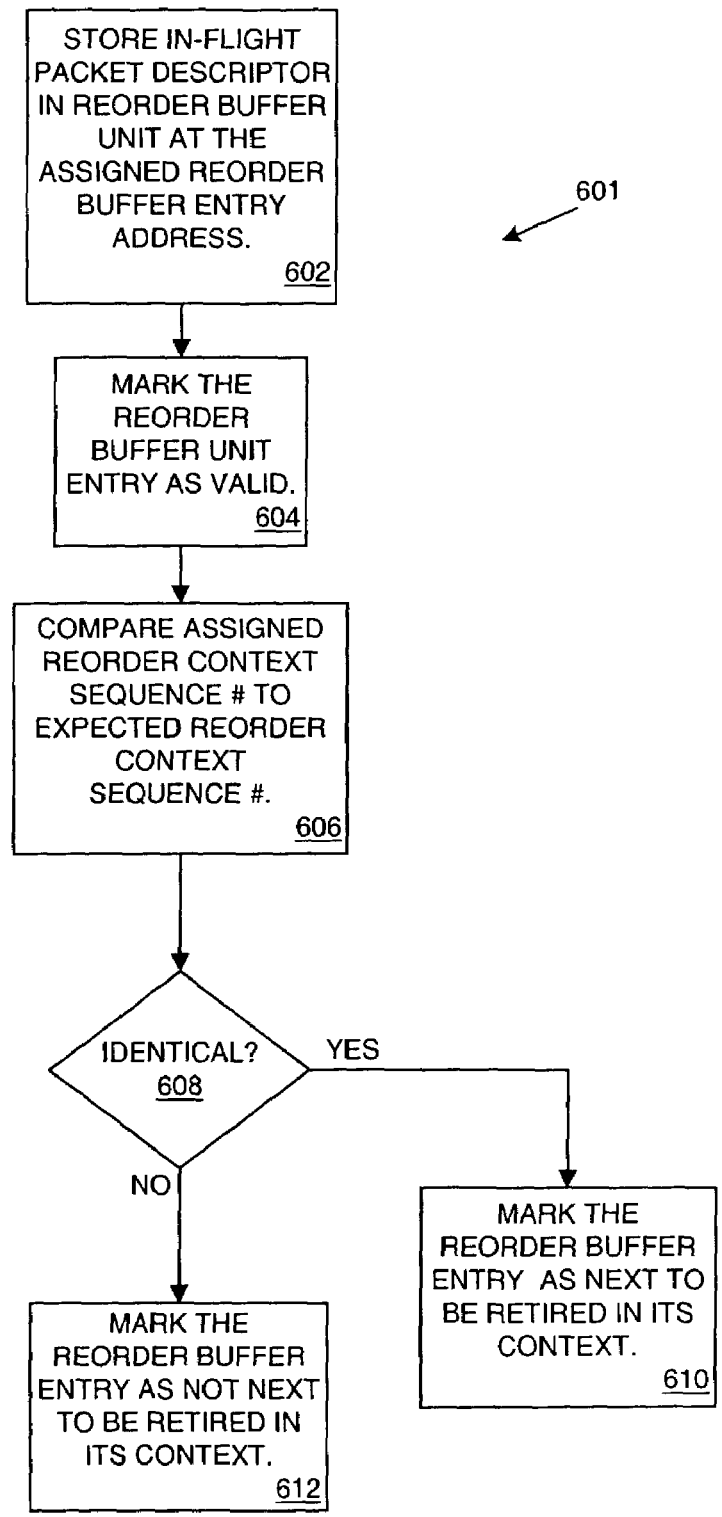
FIG. 6 is a flow diagram for the receipt of packet descriptors by the reorder unit 114 according to embodiments of the invention.

FIG. 6 is a flow diagram for the receipt of packet descriptors by the reorder unit 114 according to embodiments of the invention. In particular, FIG. 6 illustrates flow diagram 601, which begins with the storage of an in-flight packet descriptor in the reorder buffer unit 106 at the assigned reorder buffer entry address, at process block 602. From block 602, control passes to block 604.

At process block 604, the reorder buffer entry is marked as valid. From block 604, control passes to block 606. For example, in FIG. 5 the valid bit is altered to a state that indicates valid. In addition, the reorder context ID and the assigned reorder context sequence number are stored in the assigned reorder buffer entry address.

At process block 606, the in-flight packet's assigned reorder context sequence number is compared to the expected reorder context sequence number for the reorder context associated with the in-flight packet. If the sequence numbers are identical, control passes to block 610, at decision block 608. Otherwise, control passes to block 612.

At block 610, the reorder buffer entry is marked as next to be retired in its context. With regard to FIG. 5, the order ready bit is altered to indicate that the entry is the next entry to be retired. In block 612, the reorder buffer entry is marked as not next to be retired in its context. With regard to FIG. 5, the order ready bit of the reorder buffer is altered to indicate that the entry is not the next entry to be retired.

While FIG. 6 shows the multiple write operations are used to store the various information described with reference to FIG. 6 in the assigned reorder buffer entry address, alternative embodiments use more or less write operations (e.g., a single write operation could be used; a single write each of the CAM and SRAM could be used; etc.).

Figure 7:
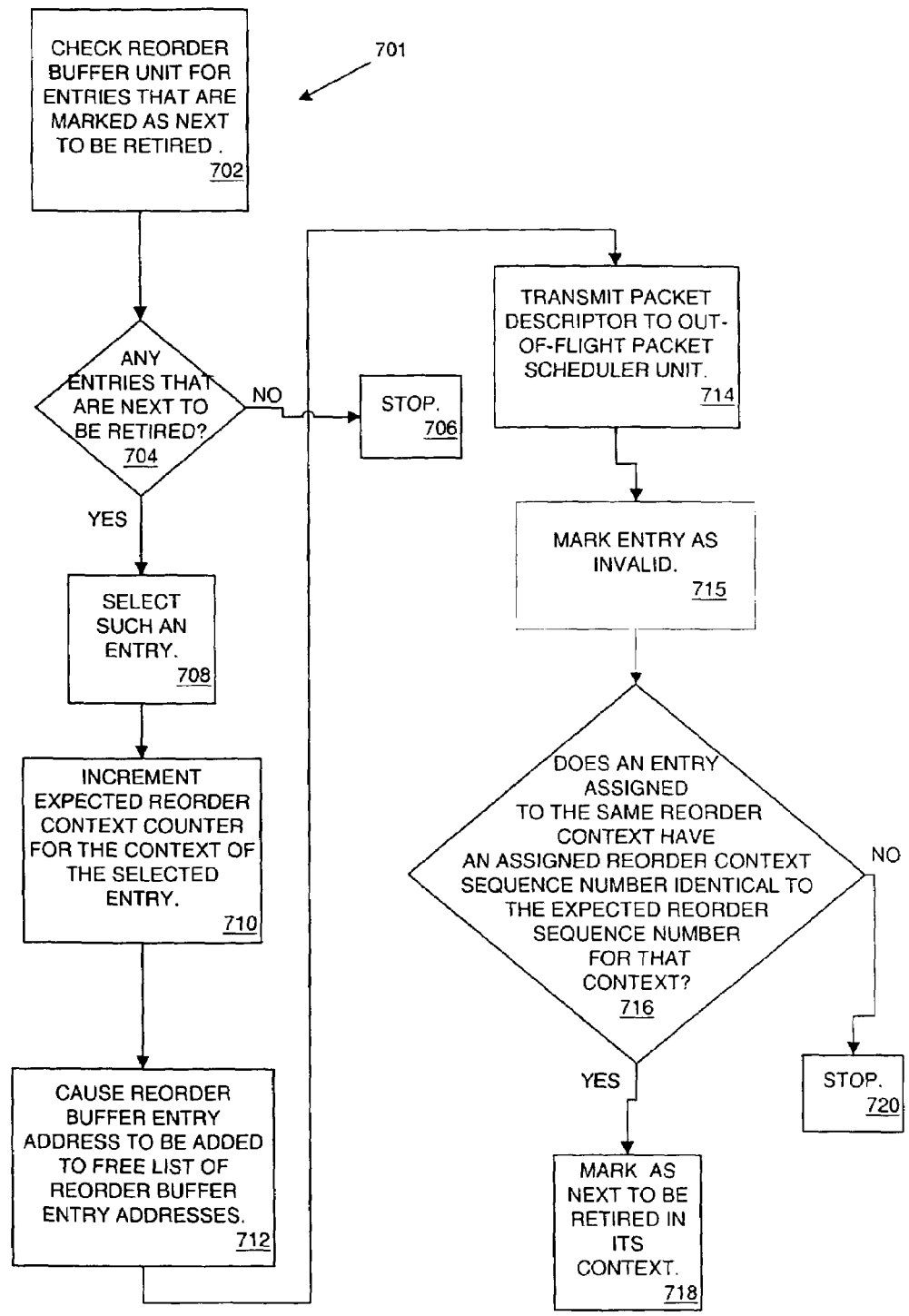
FIG. 7 is a flow diagram for the retirement of in-flight packets according to embodiments of the invention.

FIG. 7 is a flow diagram for the retirement of in-flight packets according to embodiments of the invention. In particular, FIG. 7 illustrates flow diagram 701, which begins with a check of the reorder buffer unit 106 for entries that are marked as next to be retired, at process block 702. From block 702, control passes to block 704.

At decision block 704, if there are not entries that are next to be retired, the flow diagram stops, at process block 706. Otherwise, control continues at process block 708.

At process block 708, an entry that is next to be retired is selected. For example, in the exemplary embodiment of FIG. 5, the retirement scheduler unit 508 selects an entry in reorder buffer unit 106 that is next to be retired. From block 708, control passes to block 710.

At process block 710, the expected reorder context counter for the reorder context of the selected in-flight packet is incremented. From block 710, control passes to block 712. With reference to FIG. 5, one or more signals is sent to the expected reorder context counters A-N 108 to cause the appropriate counter to increment.

At process block 712, the reorder buffer entry address of the selected in-flight packet is returned to the free list, i.e., it is retired. From block 712, control passes to block 714. With reference to FIG. 5, one or more signals is sent to the reorder number assignment unit 104 to cause the retired entry to be added to the free list.

At process block 714, the packet descriptor in the selected reorder buffer entry is transmitted to the out-of-flight packet scheduler unit 216. Referring to the exemplary embodiment of FIG. 5, the reorder unit 114 transmits the packet descriptor to be retired through the outgoing packet buffer unit 514 to the out-of-flight packet scheduler unit 216.

At process block 715, the entry is marked as invalid. According to embodiments of the invention, after the reorder unit 114 transmits packet descriptors to the out-of-flight packet scheduler unit 216, the valid bit associated with the reorder buffer unit entry is altered to indicate not valid. From block 715, control passes to block 716.

At process block 716, it is determined whether an entry assigned to the same reorder context has an assigned reorder context sequence number identical to the expected reorder sequence number for that context. If there is no such entry, then the flow diagram stops, at process block 720. Otherwise, control continues at process block 718.

At process block 718, the reorder buffer entry is marked as next to be retired in its reorder context. With regard to FIG. 5, the retirement scheduler 508 uses the reorder context identifier of the retired packet, along with the expected reorder context sequence number, to perform a lookup in the CAM unit 510. If a match is located, then the matching entry's ready bit is set to indicate that the entry is the next entry to be retired in that reorder context. In this manner, when the next packet to be retired for a given reorder context is already in-flight and stored in the reorder buffer unit 106, that packet's descriptor is located and marked as next to be retired.

While FIG. 7 illustrates the retirement of a single reorder buffer entry at a time, alternative embodiments retire more than one entry at a time. In addition, while the flow diagrams have a certain order to the blocks for purposes of illustration, in alternative embodiments the blocks are performed in a different order, different blocks are combined, and/or different blocks are performed in parallel.

Having described certain aspects of the invention, additional aspects will now be described. In particular, the use of write pending bits, drop bits, and reuse bits will now be described. As will be apparent from the below, different embodiments of the invention do not use write pending bits, drop bits, and/or reuse bits. In addition, it should be understood that write pending bits, drop bits, and reuse bits are independent aspects of the invention (that is, a given embodiment need not implement all three). The concepts of write pending bits, drop bits, and reuse bits will be introduced with reference to FIG. 8. Embodiments illustrating exemplary implementations of write pending and drop bits will be described below with reference to FIGS. 8 and 9. Embodiments illustrating exemplary implementation of reuse bits will be described below with reference to FIGS. 8, 10, and 11.

The concept of write pending bits will now be described. Execution units often modify packets during packet processing. If packet modification is required, at least part of the contents of the packet are retrieved from memory, modified, and stored back in memory. If a packet descriptor were allowed to be retired before such modifications were stored back to memory (e.g., due to caches, write buffers, etc.), then the packet processing unit 218 would forward the unmodified packet rather than the modified packet. Various embodiments prevent this situation using various different techniques. For example, certain embodiments are implemented such that it is known that such modifications will be made to memory before a corresponding packet could even reach the circuitry that select the next packet descriptor to be retired ("retirement selection circuitry") (e.g., the packet processing unit 218 is implemented such that the time it takes for a packet descriptor to reach the retirement selection circuitry is sufficiently long to guarantee that any modification will be already written to memory; a separate buffer is included in the out-of-order unit 112 to buffer packet descriptors as long as they have pending writes; etc.). As another example, certain embodiments that allow packet descriptors to reach the retirement selection circuitry before pending writes may have been completed include mechanisms that allow the retirement selection circuitry to determine if there are any pending writes (see FIG. 9). For instance, different embodiments of the invention described with reference to FIG. 8 employ write pending bits to preclude packet retirements when execution unit packet writes have not completed.

Referring now to the concept of drop bits. As is well known in the art, it is desirable and/or necessary to drop packets under certain circumstances. While certain embodiments do not allow for packets to be dropped, alternative embodiments provide different mechanisms to drop packets. For example, certain embodiments provide for mechanism to drop packets before they are selected for retirement (e.g., when an execution determines that a packet should be dropped, it drops the packet and transmits signals to cause the resources allocated for that packet to be relinquished—frees the assigned reorder buffer entry address, causes the assigned reorder context sequence number to be skipped by the reorder buffer unit; etc.) As another example, certain embodiment provide for mechanisms to drop packets after they are selected for retirement (see FIG. 9). For instance, different embodiments of the invention described with reference to FIGS. 8 and 9 employ drop bits.

Referring now to the concept of reuse bits. Reuse bits are used to maintain packet order when creating derivative packets. Derivative packets are newly created packets based on existing packets being processed, such as packets that are copied or subdivided. For example, when packets are multicast, out-of-order unit 112 creates multiple copies of a given packet, where each copy includes a distinct packet header and an identical packet body. As another example, when packets are fragmented, they are broken into multiple smaller packets. While certain embodiments do not allow for creating derivative packets, alternative embodiments provide mechanisms for maintaining packet order while creating derivative packets. For example, to maintain packet order without assigning new reorder buffer entry addresses and new reorder context sequence numbers to new derivative packets, all packets derived from the same packet reuse the same reorder buffer entry and reorder context sequence number, according to embodiments of the invention. Different embodiments of the invention described with reference to FIGS. 8, 10, and 11, employ reuse bits, as described below.

Figure 8:
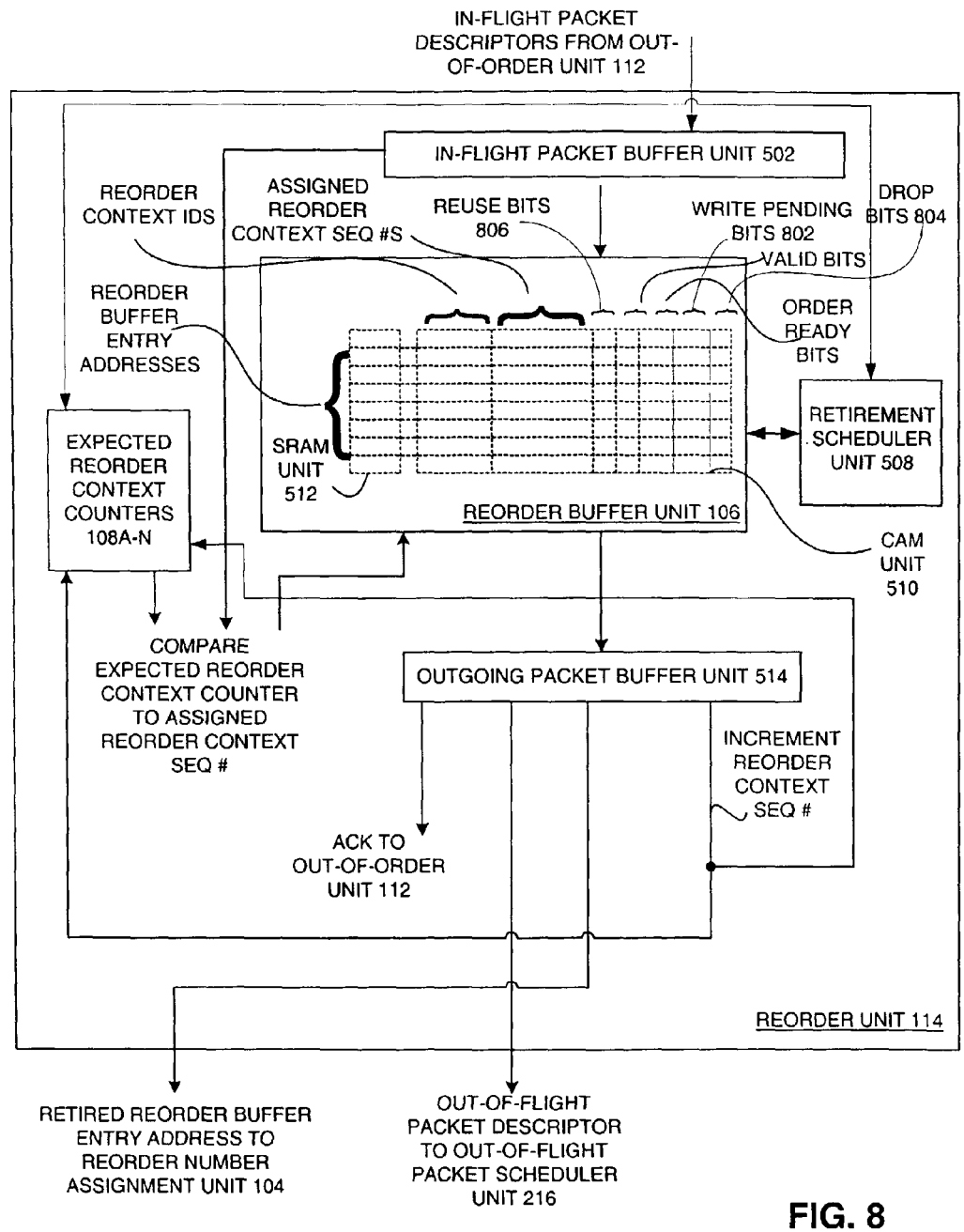
FIG. 8 is a block diagram illustrating portions of the reorder unit 114 according to embodiments of the invention.

FIG. 8 is a block diagram illustrating portions of the reorder unit 114 according to embodiments of the invention. FIG. 8 is identical to FIG. 5, except for the addition of write pending bits 802, drop bits 804, and reuse bits 806 to the reorder buffer unit entries. More specifically, the write pending bits 802, drop bits 804, and reuse bits 806 are included in CAM unit 510. For each packet descriptor, the out-of-order unit determines the states of the write pending, drop, and reuse bits.

In one embodiment of the invention, the write pending, drop, and reuse bits are altered to the state identified by the out-of-order unit along with the storing of an in-flight packet descriptor in an entry in the reorder buffer unit 106. For example, referring to the embodiment of FIG. 6, at process block 604, a reorder buffer unit entry's write pending, drop, and reuse bits may be altered when the reorder buffer unit entry is marked as valid. In contrast, alternative embodiments alter the write pending, drop, and reuse bits for a given entry to a default state when that entry is retired; and then alter only those of the write pending, drop, and reuse bits from the default state as necessary when the next in-flight packet descriptor is stored in that reorder buffer entry.

Figure 9:
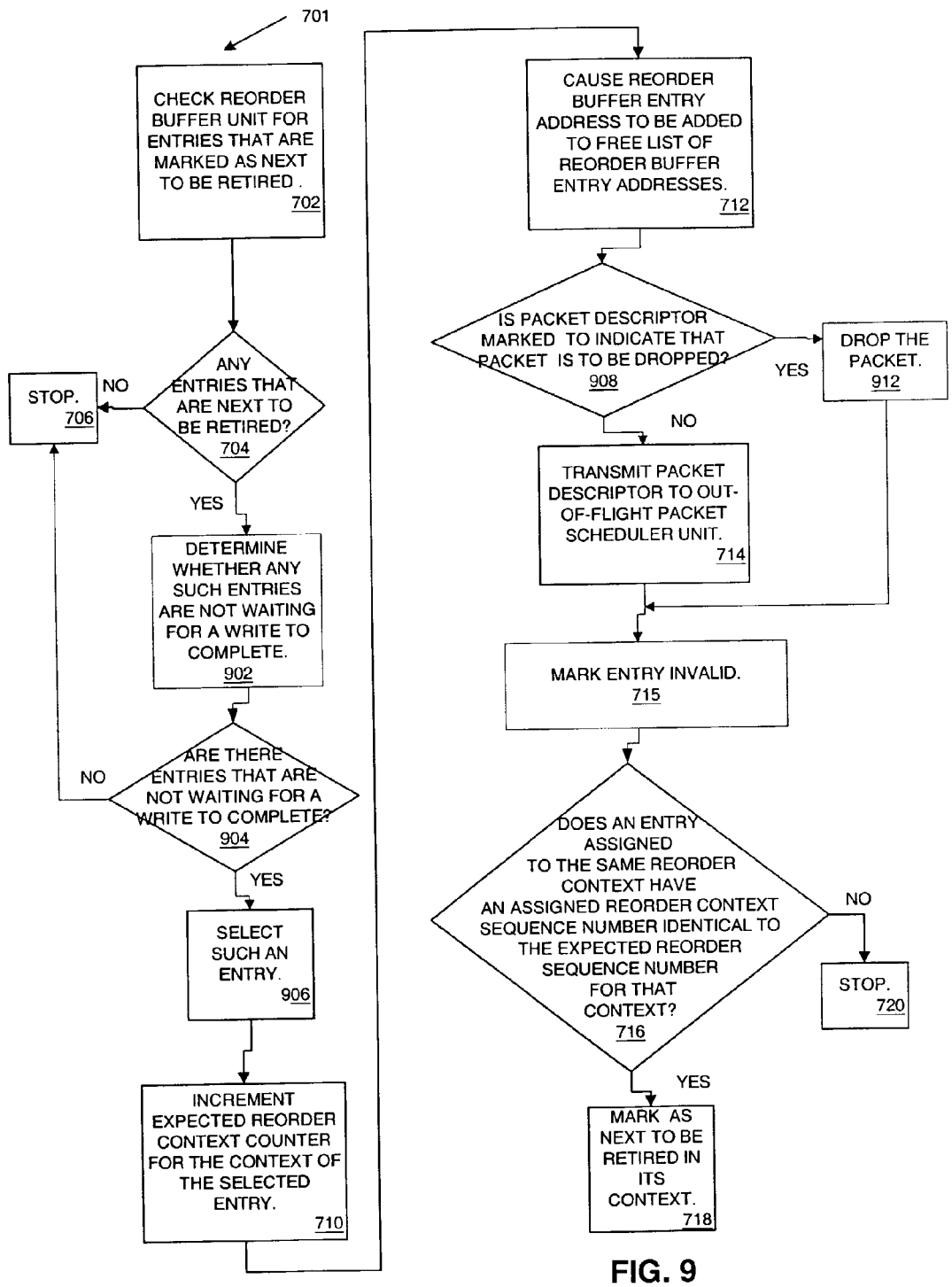
FIG. 9 is a flow diagram for the retirement of in-flight packets according to embodiments of the invention.

FIG. 9 is a flow diagram for the retirement of in-flight packets according to embodiments of the invention. FIG. 9 is similar to FIG. 7, but process blocks have been added for: 1) processing packet descriptors with pending writes; and 2) dropping packets. Because FIG. 9 is similar to FIG. 7, only the added process blocks will be described. The operations of the flow diagram will be described with reference to the exemplary embodiment of FIG. 8. However, it should be understood that the operations of flow diagrams can be performed by embodiments of the invention other than those discussed with reference to FIG. 8, and the embodiments discussed with reference to FIG. 9 can perform operations different than those discussed with reference to the flow diagrams.

From block 704, control passes to block 902 rather than block 708. At process block 902, it is determined whether entries that are next to be retired are waiting for a write to complete. In the exemplary embodiment of FIG. 8, reorder unit 114 checks the write pending bits 802 to determine whether entries that are next to be retired are waiting for a write to complete. In an embodiment, the write pending bits 802 include a single write pending bit for each entry. The write pending bits for a given reorder buffer entry indicates whether retirement of that reorder buffer entry must wait for a packet modifying write to complete. That is, when an execution unit has modified a packet, and the corresponding write has not completed, the write pending bit 802 is marked, indicating the packet's reorder buffer unit entry cannot be retired until the modification has completed in memory. Alternatively, write pending bits 802 include a write pending complete bit and a write pending needed bit for each entry of the reorder buffer entry. The write pending needed bit indicates whether an execution unit has modified a packet. Because execution units often process packets without modifying them, the write pending needed bit is marked if a packet has been modified. When the write pending needed and write pending complete bits are used in combination, entries that have not been modified (i.e., entries whose write pending needed bit indicates the packet has not been modified) are processed without determining whether the modification has completed in memory. Therefore, the reorder unit 114 does not check the write pending complete bit. For entries that have been modified (i.e. entries whose write pending needed bit indicates that packet was modified), packet processor unit 218 determines whether the modifying-write has completed by inspecting the write pending complete bit. Depending on the type of hardware and/or software employed, different embodiments may mark the write pending complete and/or write pending needed bits to zero or one. Notwithstanding the write pending complete and write pending needed bits' actual value (i.e. zero or one), marking these bits has the aforementioned meaning.

At process decision block 904, if some entries are not waiting for a write to complete, control continues at block 906. Otherwise, control passes to block 706. For example, according to embodiments that employ a single write pending bit for each reorder buffer entry, if the write pending bit indicates that the reorder buffer unit entry is not waiting for a write to complete, the reorder unit 114 need not wait with respect to the write pending bit. For embodiments employing write pending and write pending needed bits, if the write pending needed bit indicates that a write pending is not needed, the packet was not modified, and entries can be retired without waiting for a write to complete.

For entries waiting for a write operation to complete, the process stops at block 706. For example, when the process stops, depending on the embodiment, either the entry's write pending bit or both its write pending complete and write pending needed bits indicate that the any reorder buffer entries that are next to be retired are waiting for a write to complete.

At block 906, an entry is selected that is next to be retired and not waiting for a write to complete. For example, in the exemplary embodiment of FIG. 8, the reorder unit 114 selects an entry whose order ready bit indicates that it is next to be retired, and whose write pending bit(s) 802 indicate that the entry is not waiting for a write to complete. From block 906, control passes to block 710.

From block 712, control passes to block 908. At process block 908, it is determined whether the packet descriptor is to be dropped. If the packet is not to be dropped, control passes to block 714. However, if the packet is to be dropped, control continues at 912. For example in the exemplary embodiment of FIG. 8, the reorder unit 114 determines whether a reorder buffer unit entry's drop bit 804 indicates that it should drop the packet.

At process block 912, the packet is dropped and control passes to block 715 (bypassing block 714). For example, with reference to FIG. 8, the reorder unit 112 drops the packet (i.e., it does not transmit the packet to the out-of-flight scheduler unit 216).

Figure 10:
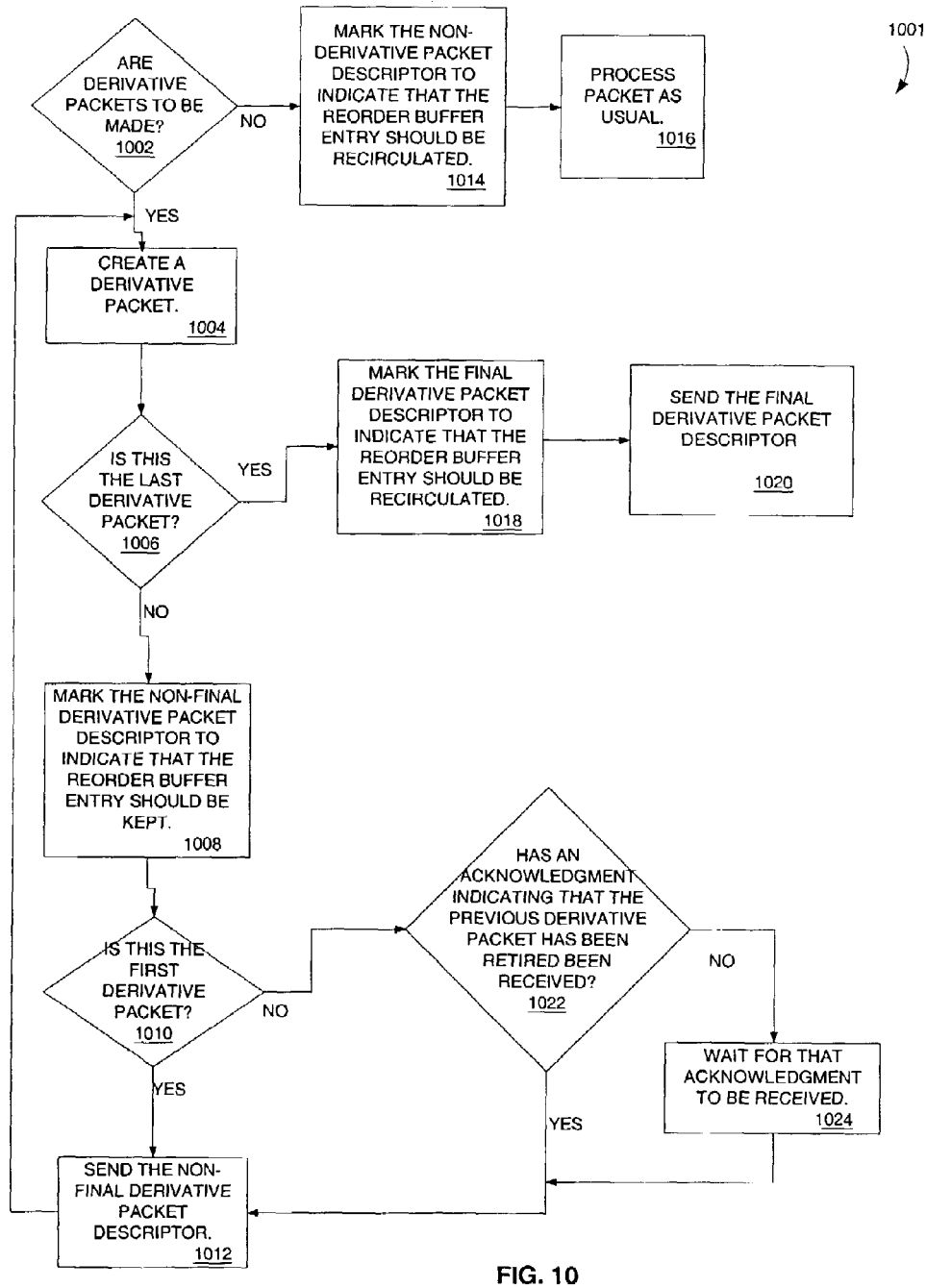
FIG. 10 is a flow diagram illustrating the processing of packets according to embodiments of the invention.

FIG. 10 is a flow diagram illustrating the processing of packets according to embodiments of the invention. The operations of the flow diagram will be described with reference to the exemplary embodiment of FIGS. 2 and 8. However, it should be understood that the operations of flow diagrams can be performed by embodiments of the invention other than those discussed with reference to FIGS. 2 and 8, and the embodiments discussed with reference to FIG. 10 can perform operations different than those discussed with reference to the flow diagrams. In particular, FIG. 10 illustrates flow diagram 1001, which begins at process block 1002.

In process block 1002, it is determined whether derivative packets are to be made. If derivative packets are to be made, control continues at process block 1004. Otherwise control continues at process block 1014. According to the exemplary embodiment of FIG. 2, the out-of-order unit 112 determines whether derivative packets are to be made. For example, a derivative packet may be made when a packet is to be multicast or fragmented.

As shown in process block 1014, the nonderivative packet descriptor is marked to indicate that the reorder buffer entry should be recirculated. For example, out-of-order unit 112 may mark the nonderivative packet descriptor's reuse bit 806 to indicate the packet's entry in reorder buffer unit 106 should be added to the free list of reorder buffer unit entry addresses 208 after it is retired. From block 1014, control passes to block 1016.

In process block 1016, the packet is processed as usual. For example, the out-of-order unit 112 performs any necessary packet processing and transmits the packet's descriptor, reorder context identifier, reorder context sequence number, and reorder buffer entry address to the reorder unit 114.

As shown in process block 1004, a derivative packet is created. Control continues at process decision block 1006.

In process decision block 1006, it is determined whether the packet created is the last derivative packet to be made. For example, the out-of-order unit 112 determines whether the current packet is the last derivative packet to be made. If it is the last derivative packet to be made, control continues at process block 1018. Otherwise, control continues at process block 1008.

As shown in process block 1018, the final derivative packet descriptor is marked to indicate that the reorder buffer entry should be recirculated. Control continues at process block 1020. For example, the out-of-order unit 112 marks the packet descriptor to indicate that the reorder buffer unit entry should be recirculated. That is, the out-of-order unit 112 is instructing the reorder unit to add the reorder buffer unit entry to the free list of reorder buffer unit entry addresses 208.

In process block 1020, the final derivative packet descriptor is sent. The out-of-order unit 112 sends the final derivative packet's descriptor, reorder context identifier, reorder context sequence number, and reorder buffer entry address to the reorder unit 114.

As shown in process block 1008, the non-final derivative packet descriptor is marked to indicate that the reorder buffer entry should be kept. For example, the out-of-order unit 112 marks the non-final derivative packet descriptor's reuse bit 806 to indicate that the reorder buffer entry should not be added to the free list of reorder buffer entry addresses 208.

In process block 1010, it is determined whether the packet is the first derivative packet. If the packet is the first derivative packet, control continues at process decision block 1022. Otherwise, control continues at process block 1012.

As shown in process block 1022, it is determined whether an acknowledgement indicating that the previous derivative packet has been retired has been received. For example, the out-of-order unit 112 determines whether it has received an acknowledgement indicating that the reorder unit 114 has retired the previous derivative packet. If such an acknowledgement has been received, control continues at process block 1024. Otherwise, control continues at process block 1012.

In process block 1024, there is a wait for the acknowledgement to be received. For example, the execution unit of the out-of-order unit 112 processing the packet does not continue processing derivative packets until it receives the acknowledgement indicating that the previous derivative packet has been retired. Control continues at process block 1012.

As shown in process block 1012, the non-final derivative packet descriptor is sent. For example, the out-of-order unit 112 sends the non-final derivative packet descriptor to the reorder unit 114. Control continues back to process block 1004.

Figure 11:
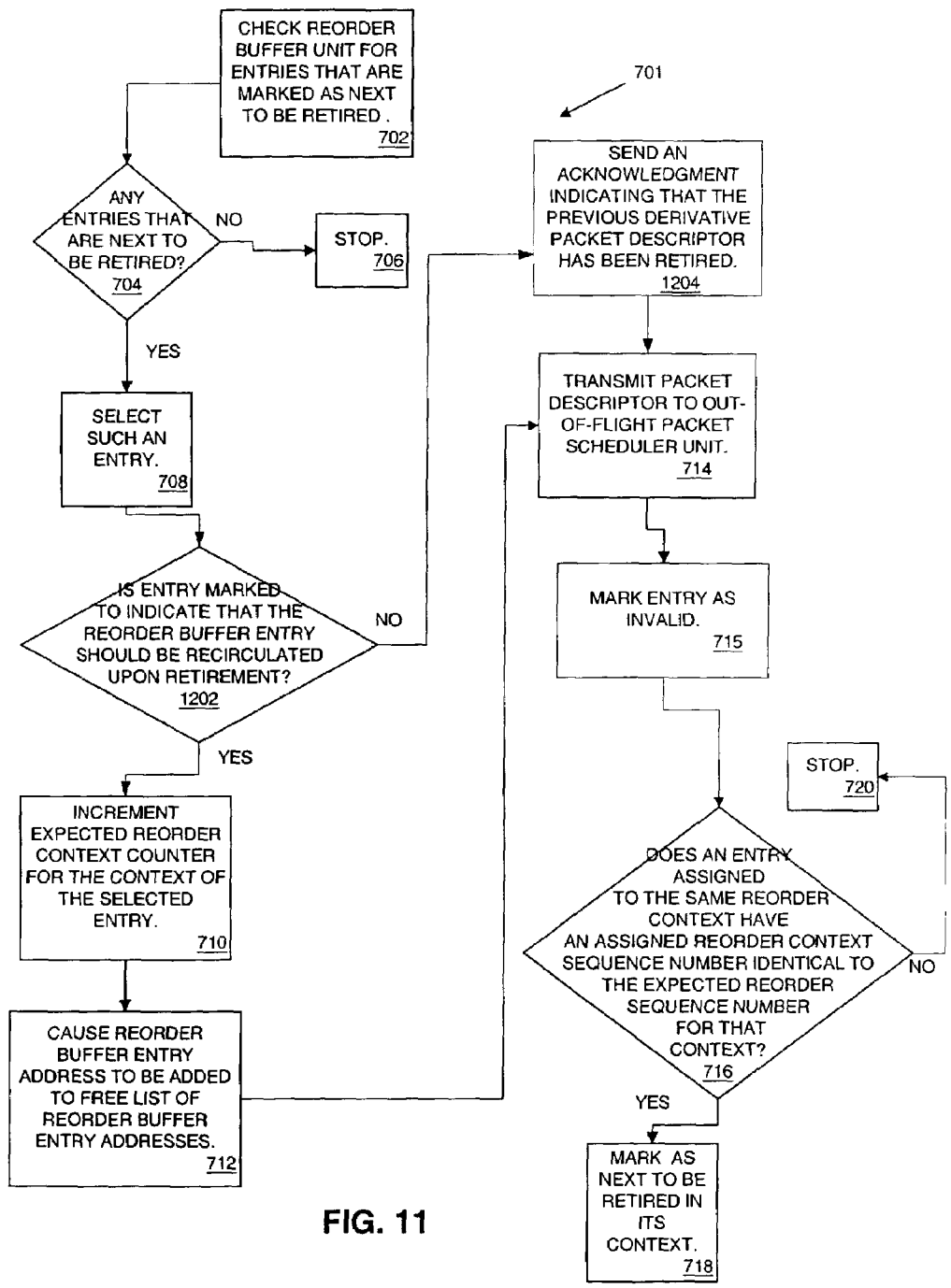
FIG. 11 is a flow diagram illustrating the retirement of derivative packets according to embodiments of the invention.

FIG. 11 is a flow diagram illustrating the retirement of derivative packets according to embodiments of the invention. FIG. 11 is similar to FIG. 7, with process blocks added for recirculating reorder buffer entries. Because FIG. 11 is similar to FIG. 7, only the added process blocks will be described. The operations of the flow diagram will be described with reference to the exemplary embodiment of FIGS. 2 and 8. However, it should be understood that the operations of flow diagrams can be performed by embodiments of the invention other than those discussed with reference to FIGS. 2 and 8, and the embodiments discussed with reference to FIG. 11 can perform operations different than those discussed with reference to the flow diagrams.

From block 708, control passes to block 1102. In process decision block 1102, it is determined whether the selected entry is marked to indicate that the reorder buffer entry should be recirculated upon retirement. For example, reorder unit 114 determines whether the selected entry's reuse bit is marked to indicate that the reorder buffer unit entry should be recirculated upon retirement. If the entry is marked to indicate that the reorder buffer entry should be recirculated upon retirement, control continues at process block 1104. Otherwise, control continues at process block 710. From process block 710, the process continues as described above with reference to FIG. 7.

As shown in process block 1104, an acknowledgement indicating that the previous derivative packet descriptor has been retired is sent. For example, the reorder unit 114 sends an acknowledgement to the out-of-order unit 112 after the reorder unit 114 retires the pervious derivative packet descriptor. According to certain embodiments, after the out-of-order unit 112 retires the previous derivative packet descriptor from the reorder buffer unit 106, the next derivative packet may reuse the retired reorder buffer unit entry. From block 1104, control passes to block 714. The process continues and completes as described above with reference to FIG. 7.

When derivative packets are made, as described above with reference to FIG. 10, the out-of-order unit 112 transmits write pending information to the reorder unit 114. In one embodiment, the out-of-order unit 112 marks the packet descriptor of each packet for which a write operation is pending. However, in a alternative embodiment, the out-of-order unit 112 marks one packet descriptor to indicate that write operations are pending for a group of packets. To illustrate communications within the packet processor unit 218 for derivative packet processing according to embodiments of the invention, FIG. 12 will now be described.

Figure 12:
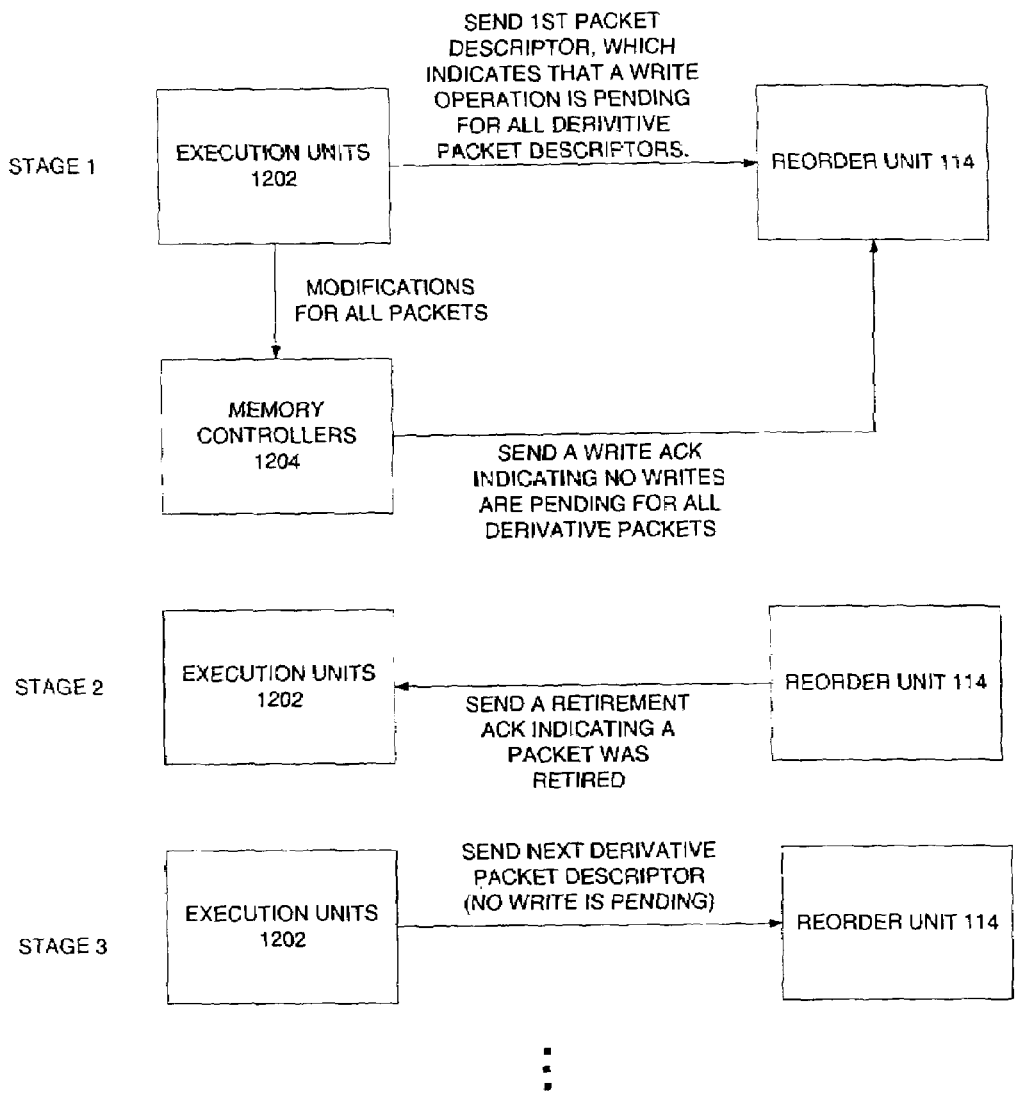
FIG. 12 is a data flow diagram illustrating communications for processing derivative packets within a packet processor unit, according to an embodiment of the invention.

FIG. 12 is a data flow diagram illustrating communications for processing derivative packets within a packet processor unit, according to an embodiment of the invention. The communications for tracking pending derivative packet write operations may be divided into several stages. These communications are between the execution unit(s) 1202, memory controllers 1204, and reorder unit 114.

At stage 1, an execution unit(s) 1202 modifies all the derivative packets for a derivative packet operation. For example, for a multicasting operation, the execution unit(s) 1202 creates all the necessary multicast packets by transmitting all necessary write operations to the memory controller(s) 1004. Also during stage 1, the execution unit(s) 1202 sends a first packet descriptor to the reorder unit 114 to indicate that a write operation is pending for all of the derivative packets. Upon completing all of the memory write operations (e.g., creating all of the multicast packets), the memory controller(s) 1204 transmits to the reorder unit 114 a write acknowledgement indicating that no write is pending for any of the multicast packets. For derivative packet operations, it should be understood that the execution unit(s) 1202 marks only one packet descriptor to indicate that writes are pending for one or more of the derivative packets, according to an embodiment of the invention.

At stage 2, the reorder unit 114 transmits a retirement acknowledgement indicating that a derivative packet was retired. For example, when the reorder unit 114 retires a multicast packet, it sends a retirement acknowledgement to the execution unit(s) 1202.

At stage 3, the execution unit(s) 1202 transmits the next derivative packet descriptor. It should be noted that no write is pending for this packet for the reasons described above. Stages 2 and 3 are repeated until all of the derivative packets are retired.

According to an alternative embodiment, the execution unit(s) 1202 marks each derivative packet descriptor to indicated that a write is pending for the corresponding derivative packet (as opposed to marking only one derivative packet descriptor to indicate that a write is pending for all of the derivative packets of that derivative packet operation). Therefore, the memory controller(s) 1204 sends to the reorder unit 114 a write pending acknowledgement after each write operation has completed (e.g., after each derivative packet has been created). After receiving a write complete acknowledgement, the reorder unit 114 retires the packet and transmits a retire acknowledgement indicating the derivative packet was retired. This process is repeated until all derivative packets are retired.

A machine-readable medium includes any mechanism that provides (i.e., stores and/or transmits) information in a form readable by a machine (e.g., a compute). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. The line cards and control cards included in the different network elements include memories, processors, and/or Application Specific Integrated Circuits ("ASICs").

Although the invention has been described with reference to specific exemplary embodiments, it will be evident that various modifications and changes may be made to these embodiments without departing from the broader spirit and scope of the invention. For example, different input formats may be used. Accordingly, the specification and drawings are to be regarded in an illustrative rather than a restrictive sense.

What is claimed is:

1. A method comprising:

receiving packets in a global order, the packets being designated for different ones of a plurality of reorder contexts;

for each of the plurality of reorder contexts, assigning reorder context sequence numbers indicating an order relative to the global order of the packets designated for that reorder context;

storing packet descriptors representing each of the received packets in a shared reorder buffer;

completing processing of at least certain of the packets out of order using out-of-order processing, the out-of-order processing including both processing packets out of the global order and processing packets out of reorder context order;

for each of the plurality of reorder contexts, maintaining a first indication of the one of the sequence numbers assigned to one of the packets that is next to be retired for that reorder context; and retiring the packet descriptors for each of the packets from the shared reorder buffer, based on the sequence numbers, in order with respect to each of the plurality of reorder contexts, but out of the global order for at least certain of the packets.

2. The method of claim 1 further comprising:

for each of the packets, maintaining a second indication of whether the packet is to be transmitted responsive to retiring the packet;

transmitting those of the packets for which the second indication indicates that those packets are to be transmitted responsive to their retirement; and dropping those of the packets for which the second indication indicates that those packets are not to be transmitted responsive to their retirement.

3. The method of claim 2 wherein the first indication and the second indication are stored in the shared reorder buffer.

4. The method of claim 1 further comprising:

for each of the packets, maintaining a second indication of whether a modification of the packet is pending, wherein the retiring further includes, retiring those of the packet descriptors for each of the packets for which the second indication indicates that modification of those packets has completed.

5. The method of claim 4 wherein those of the packet descriptors for each of the packets, for which the second indication indicates that modification of those packets has not completed, are retired after the second indication indicates that modification of those packets has completed.

6. The method of claim 1 wherein the shared reorder buffer is a content addressable memory.

7. A method comprising:

receiving packets in a global order, the packets being designated for different ones of a plurality of reorder contexts;

recording, for each of the plurality of reorder contexts, a context order indicating the order of the packets designated for that reorder context;

storing packet descriptors representing each of the received packets in a shared reorder buffer;

completing processing of at least certain of the packets out of order using out-of-order processing, the out-of-order processing including both processing packets out of the global order and processing packets out of reorder context order;

retiring the packet descriptors for each of the packets from the shared reorder buffer in order with respect to the context orders, but out of the global order for at least certain of the packets, said retiring including, responsive to retiring each of the packet descriptors corresponding to each of the packets, checking the entries of the shared reorder buffer to determine if there is already stored in the shared reorder buffer a packet descriptor for one of the packets that was designated to the same one of the plurality of reorder contexts and that is the next to be retired within that reorder context.

8. The method of claim 7 further comprising:

for each of the packet descriptors currently stored in the shared reorder buffer, maintaining an indication of whether the packet is to be transmitted responsive to its retirement;

transmitting those of the packets for which the indication indicates that those packets are to be transmitted responsive to their retirement; and dropping those of the packets for which the indication indicates that those packets are not to be transmitted responsive to their retirement.

9. The method of claim 8 wherein the indication is stored in the shared reorder buffer.

10. The method of claim 7 further comprising:

for each of the packet descriptors currently stored in the shared reorder buffer, maintaining an indication of whether a modification of the packet has completed, wherein the retiring further includes, retiring those of the packet descriptors for each of the packets for which the indication indicates that modification of those packets has completed.

11. The method of claim 7 wherein the shared reorder buffer is a content addressable memory.

12. A method comprising:

receiving packets in a global order;

assigning each of the packets to one of a plurality of reorder contexts;

for each of the plurality of reorder contexts, assigning reorder context sequence numbers indicating an order relative to the global order of the packets assigned to that reorder context;

receiving requests to process the received packets;

for each of the requests, assigning to the packet scheduled to fulfill that request an address in a shared memory for storing a packet descriptor representing that packet;

completing processing of at least certain of the packets out of order using out-of-order processing, the out-of-order processing including both processing packets out of the global order and processing packets out of reorder context order;

for each of the packets, when the packet's packet descriptor is stored in the shared memory, comparing that packet's assigned reorder context sequence number with an expected reorder context sequence number for that packet's assigned reorder context, the expected reorder context sequence number for a given reorder context indicating the reorder context sequence number of the next packet to be retired for the given reorder context;

upon determining that at least one of the packets has an assigned reorder context sequence number identical to the expected reorder context sequence number for the at least one packet's assigned reorder context, retiring at least one of the packet descriptors for each of those packets;

freeing the addresses that were assigned to the packets that have been retired; and responsive to each retirement of the packet descriptors corresponding to each packet, determining whether a packet assigned to the same reorder context as the retired packet descriptor is stored in the shared memory and has an assigned reorder context sequence number identical to the expected reorder context sequence for the packet's context.

13. The method of claim 12 further comprising:

for each of the packets, maintaining an indication of whether the packet is to be transmitted after the packet descriptors for each packet is retired;

transmitting those of the packets for which the indication indicates that those packets are to be transmitted after their corresponding packet descriptors are retired; and dropping those of the packets for which the indication indicates that those packets are not to be transmitted after their corresponding packet descriptors are retired.

14. The method of claim 12 further comprising:

for each of the packet descriptors currently stored in the shared memory, maintaining an indication of whether a modification of the packet has completed, wherein a given one of the packet descriptors for each of the packets is not ready for retirement until said indication indicates that that packet has completed.

15. The method of claim 12 wherein the shared memory is a content addressable memory.

16. An apparatus comprising:

a reorder number assignment unit to receive packets in a global order, each of the packets being designated to one of a plurality of reorder contexts, the reorder number assignment unit including,
   a reorder context sequence number counter for each of the plurality of reorder contexts, and
   a free list of addresses of currently available locations in a reorder buffer;

an out-of-order processing unit for processing the received packets out of order, coupled with the reorder number assignment unit, including a plurality of execution units, the execution units to execute the received packets out of order including both to execute packets out of the global order and to execute packets out of reorder context order;

a reorder unit, coupled with the out-of-order unit and the reorder number assignment unit, including,
   said reorder buffer to store reorder context sequence numbers currently assigned to packets allocated locations in said reorder buffer;
   an expected reorder context counter for each of the plurality of reorder context to indicate the reorder context sequence number assigned to the next packet to be retired for that reorder context, and
   a retirement scheduler coupled to the reorder buffer unit and the expected reorder context counters.

17. The apparatus of claim 16 wherein the locations in said reorder buffer include write pending bits to indicate whether modification has completed.

18. The apparatus of claim 16 wherein the locations in said reorder buffer includes drop bits to indicate which locations in said reorder buffer are currently allocated packets that are to be dropped.

19. The apparatus of claim 16 wherein said reorder buffer includes a content addressable memory.

20. An apparatus comprising:

a reorder number assignment unit, the reorder number assignment unit to receive packets in a global order, each of the packets being designated to one of a plurality of reorder contexts and assigned a reorder context sequence number for the designated reorder context;

an out-of-order processing unit for processing the received packets out of order, coupled with the reorder number assignment unit, including a plurality of execution units, the execution units to execute the received packets out of order including both to execute packets out of the global order and to execute packets out of reorder context order;

a reorder unit, coupled with the out-of-order unit and the reorder number assignment unit, including,
   a reorder buffer including a content addressable memory to store both packet descriptors representing each of the received packets and ordering information relating to the reorder context sequence numbers regarding the plurality of reorder contexts, and
   a retirement scheduler coupled to the reorder buffer.

21. The apparatus of claim 20 wherein said reorder buffer includes a plurality of locations, the locations including write pending bits to indicate whether there is a write pending for each location.

22. The apparatus of claim 20 wherein said reorder buffer includes a plurality of locations, the locations including drop bits to indicate whether dropping is necessary.

23. A network element comprising:

a plurality of line cards, each of the plurality of line cards to receive packets in a global order, each of the plurality of line cards including,
   a packet processor, the packet processor including,
      a reorder number assignment unit, the reorder number assignment unit to receive the packets, each of the packets being designated to one of a plurality of reorder contexts and assigned a reorder context sequence number for the designated reorder context;
      an out-of-order processing unit to process the received packets out of order, coupled with the reorder number assignment unit, including a plurality of execution units, the execution units to execute the received packets out of order including both to execute packets out of the global order and to execute packets out of reorder context order;
      a reorder unit, coupled with the out-of-order unit and the reorder number assignment unit, including,
         a reorder buffer including a content addressable memory to store both packet descriptors representing each of the received packets and ordering information relating to the reorder context sequence numbers regarding the plurality of reorder contexts,
         a retirement scheduler coupled to the reorder buffer, and
      an output scheduler to schedule transmission of the packets out of the network element.

24. The network element of claim 23 wherein said reorder buffer includes a plurality of locations, each location including a fence field to indicate whether modification has completed for the one of the packets associated with the location.

25. The network element of claim 23 wherein said reorder buffer includes a drop field to indicate which locations in said reorder buffer are currently allocated packets that are to be dropped.

26. The network element of claim 23 wherein the reorder number assignment unit comprises:
   a reorder context sequence number counter for each of the plurality of reorder contexts, and
   a free list of addresses of currently available locations in said reorder buffer; and
   wherein the reorder unit includes an expected reorder context counter for each of the plurality of reorder contexts to indicate the reorder context sequence number assigned to the next packet descriptor corresponding to each packet to be retired for that reorder context.

* * * * *